United States Patent Office 3,193,491
Patented July 6, 1965

3,193,491
PREPARATION OF A HYDROCRACKING CATALYST AND HYDROCRACKING THEREWITH
Robert H. Cramer and Sylvander C. Eastwood, Woodbury, and Abbott F. Houser, Cherry Hill, N.J., assignors to Socony Mobil Oil Company, Inc., a corporation of New York
No Drawing. Filed July 2, 1964, Ser. No. 380,042
The portion of the term of the patent subsequent to July 7, 1981, has been disclaimed
21 Claims. (Cl. 208—111)

The present application is a continuation-in-part of our copending application, Ser. No. 95,011, filed March 13, 1961, now U.S. Patent No. 3,140,250.

This invention relates to an improved hydrocracking conversion catalyst comprising a silica-zirconia-alumina base prepared in a particular manner and impregnated with a minor proportion of a catalytic hydrogenation component. The invention is further directed to a process wherein a high boiling hydrocarbon or hydrocarbon mixture, for example, a petroleum fraction, is subjected to cracking in the presence of hydrogen and the aforementioned catalyst.

As is well known, cracking refers generally to operations wherein a long chain hydrocarbon or a mixture of high molecular weight hydrocarbons is converted into a shorter chain hydrocarbon or into a mixture of lower molecular weight hydrocarbons. Cracking accomplished solely as a result of the high operational temperature employed is known as thermal cracking while cracking effected in the presence of a catalyst is known as catalytic cracking. Cracking carried out in the presence of excess hydrogen is referred to as hydrocracking.

Many operations for the conversion of hydrocarbon materials are carried out in the presence of inorganic oxide gels, alone or as a base for other catalytic components, which gels exert a catalytic effect upon the hydrocarbons. Such inorganic oxide gels are generally prepared by the formation of a sol of a desired composition, which sol will set to form a hydrogel after a lapse of a suitable period of time. The resulting hydrogel is washed to remove impurities and then dried to remove the liquid phase therefrom. Additional catalytic components may be added subsequently. Typical solid porous catalysts of this type include gels of silica, alumina, zirconia, magnesia, and the like. Such gels frequently comprise a cogel of two or more inorganic oxides, for example, silica-alumina, silica-zirconia, silica-alumina-zirconia, silica-alumina-chromia, and the like. Typical catalytic hydrogenation components include platinum, cobalt, nickel, palladium, chromium, molybdenum, tungsten, mixtures thereof, and the like.

Modern catalytic hydrocracking processes require a catalyst which is not only specifically active in the chemical reactions which are to be catalyzed but also possesses physical characteristics required for commercially successful operation. One of the important physical attributes of a commercial catalyst is hardness, i.e., the ability to resist attrition. The ability of a particle to hold its shape in withstanding the mechanical handling to which it is subjected upon storage, shipment and use is therefore a significant requirement for a successful hydrocracking catalyst. Catalytic hydrocracking operations in which heavy petroleum fractions are converted to lighter materials boiling in the range of gasoline are carried out in the presence of a solid porous catalyst, generally a composite of silica-alumina containing a minor proportion of one or more added metals, metal oxides or sulfides.

Another important physical attribute of a modern-day hydrocracking catalyst is its diffusivity. Diffusivity is a measurable property of a catalyst which characterizes the ability of fluids to diffuse therethrough. High catalyst diffusivity permits rapid diffusion of hydrocarbon vapors and other gases throughout the catalyst structure, thereby making possible the use of high space velocities of hydrocarbons and requiring less time for regeneration of the catalysts when they have become fouled with carbonaceous materials. It is accordingly desirable to increase carbon burning capacity by improving the carbon burning rate for the spent catalysts.

One inorganic oxide gel that has received particular attention as a base or support for a hydrogenation component in hydrocracking is silica-alumina into which has been incorporated a certain proportion of fines. These fines are a solid powdered material insoluble in the initial hydrosol and capable of retaining a discrete character in the resultant hydrogel. It has been found that the incorporation of such fines into the oxide gel results in a catalyst having improved attrition resistance and improved hardness. U.S. Patent 2,900,349 describes in considerable detail the preparation of such fines-containing catalysts. The addition of high density fines to any catalyst will increase the catalyst density and may also improve the catalyst attrition resistance and diffusivity. The increase in density will permit greater hydrocarbon throughput. The increased attrition resistance will result in lower catalyst makeup rates.

Three component oxide gels, e.g., silica-zirconia-alumina, frequently have been used in catalytic hydrocarbon treatments. A number of methods for the preparation of this type of catalyst have been described. Typically, a silica gel is prepared by acidifying a solution of sodium silicate. Alumina and zirconia are subsequently deposited on the hydrated silica gel to form the three component system. Alternatively, silica may first be treated with an aluminum salt to form a silica-alumina system, and this system is then treated with a zirconium salt to form the desired three component system.

However, such prior art gels are in reality gelatinous precipitates. The intermediate hydrogel state obtained in preparation of the present catalysts and described hereinafter is to be distinguished from such gelatinous precipitates. True all-embracing hydrogels occupy the entire volume of the solution from which they are formed and possess a definitely rigid structure. When fractured, a true hydrogel shows a conchoidal fracture as compared to an irregular ragged edge fracture as obtained in the case of gelatinous precipitates. The latter occupy only a part of the volume of the solution from which they are formed and have no rigidity of structure. In addition, hydrogels can generally be more easily washed free of soluble impurities due to the tendency of gelatinous precipitates to peptize on washing. A district and further advantage of hydrogels is that due to their rigid structure, they can be formed into high quality spheroidal particles.

Hydrocracking operations have heretofore been proposed in which there is employed a catalyst comprising one or more components exhibiting hydrogenation activity, such as the metals of Groups VI and VIII of the Periodic Table either in elemental form or in the form of the oxides or sulfides of these metals. Such components have been deposited by impregnation on alumina and silica-alumina supports and the like. Although such catalysts have proved to be satisfactory, they remain subject to improvement, particularly in regard to selectively to afford a high yield of useful products with a small concomitant yield of undersirable products.

It is accordingly an object of the present invention to provide a novel method for the preparation of a silica-zirconia-alumina solid process catalyst, suitable for use as a base for addition of hydrogenation components in the formation of novel silica-zirconia-alumina hydrocracking catalysts.

A further object of the invention is to provide a method for the preparation of solid porous silica-zirconia-alumina hydrocracking catalysts offering considerable advantages in the conversion of hydrocarbon materials in the presence of excess hydrogen, these advantages being particularly reflected in improved gasoline yields and improved product distribution.

Other objects and advantages of the present invention will become manifest to those skilled in the art from the following detailed description and illustration thereof.

In accordance with the present invention, there has now been discovered a catalyst possessing unusual activity and selectivity in the hydrocracking of petroleum hydrocarbons. The catalyst of the present invention comprises a hydrogenation component, particularly one selected from the group consisting of oxides of metals, sulfides of metals and metals of Groups VI and VIII of the Periodic Table in intimate combination with a silica-zirconia-alumina hydrogel, prepared by intimately mixing an aqueous acid zirconium salt solution containing aluminum ions with an aqueous alkali metal silicate solution in such proportions as to form a hydrosol having a pH of from 7 to 10 and capable of setting to a hydrogel containing from 75 to 90 percent by weight silica, from about 5 to 15 percent zirconia, and from about 5 to 10 percent alumina, which proportions are based on cogelled oxides content. The resulting hydrosol is permitted to set to a hydrogel; preferably the hydrogel is subjected to hydrothermal treatment so as to control the density of the finished catalyst. The hydrogel so formed is activated by treatment at an elevated temperature with a low pH solution of either an acid, an aluminum salt, or a combination thereof, and subsequently scavenged (e.g., treated with an ammonium salt solution) to remove any residual zeolitic alkali therefrom. The resulting hydrogel product is washed free of soluble matter, and subsequently dried.

In one embodiment, the present invention affords a process for hydrocracking a hydrocarbon charge by contacting the same in the presence of hydrogen under hydrocracking conditions with a catalyst comprising a hydrogenation component selected from the group consisting of oxides of metals, sulfides of metals and metals of Groups VI and VIII of the Periodic Table in combination with a silica-zirconia-alumina gel, prepared by intimately mixing an aqueous acid zirconium salt solution containing aluminum ions with an aqueous alkali metal silicate solution in such proportions as to from a hydrosol having a pH of from 7 to 10 and capable of setting to a hydrogel containing from about 75 to 90 percent by weight silica, from about 5 to 15 percent zirconia, and from about 5 to 10 percent alumina, which proportions are based on cogelled oxides content permitting the hydrosol to set to a hydrogel; preferably subjecting the hydrogel to hydrothermal treatment to control the density of the finished catalyst; activating the hydrogel by treatment at an elevated temperature with a low pH solution of either an acid, an aluminum salt, or combination thereof; scavening (e.g., treating with an ammonium salt solution) to remove any residual zeolitic alkali therefrom; washing the hydrogel free of soluble matter; and drying the hydrogel.

In another embodiment, the invention provides an improved hydrocracking catalyst consisting essentially of a hydrogenation component selected from the group consisting of oxides of metals, sulfides of metals and metals of Groups VI and VIII of the Periodic Table intimately combined with a silica-zirconia-alumina hydrogel, prepared by mixing an aqueous alkali metal silicate solution in such proportions as to form a hydrosol having a pH of from 7 to 10 and capable of setting to a hydrogel containing from about 75 to 90 percent by weight silica, from about 5 to 15 percent zirconia, and from about 5 to 10 percent alumina, which proportions are based on cogelled oxides content; permitting the hydrosol to set to a hydrogel; preferably subjected the hydrogel to hydrothermal treatment to control the density of the finished catalyst; activating the hydrogel by treatment at an elevated temperature with a low pH solution of either an acid, an aluminum salt, or a combination thereof; scavenging (e.g., treating with an ammonium salt solution) to remove any residual zeolitic alkali therefrom; washing the hydrogel free of soluble matter; and drying the hydrogel.

In a still further embodiment, the invention resides in a method for making a hydrocracking catalyst by intimately mixing an aqueous acid zirconium salt solution containing aluminum ions with an aqueous alkali metal silicate solution in such proportions as to form a hydrosol having a pH of from 7 to 10 and subsequently to set to a hydrogel containing from about 75 to 90 percent by weight silica, from about 5 to 15 percent zirconia, and from about 5 to 10 percent alumina, these proportions based on cogelled oxides content; permitting the hydrosol to set to a hydrogel; preferably subjecting the hydrogel to hydrothermal treatment thereby to control the density of the finished catalyst; activating the hydrogel by treatment at an elevated temperature with a low pH solution of either an acid, an aluminum salt, or a combination thereof; scavenging (e.g., treating with an ammonium salt solution) to remove any residual zeolitic alkali therefrom; washing the hydrogel free of soluble matter; drying the hydrogel; and impregnating the resulting silica-zirconia-alumina gel with between about 0.01 and about 25 percent by weight of a hydrogenation component selected from the group consisting of oxides of metals, sulfides of metals and metals of Groups VI and VIII of the Periodic Table.

In accordance with another aspect of the present invention, a hydrocracking catalyst of silica, zirconia and alumina having a hydrogenation component impregnated thereon, possessing all of the aforesaid properties and also exhibiting unusual attrition resistance and diffusivity is prepared in a maner similar as above described; however, a predetermined proportion of insoluble fines, e.g., alumina fines, is initially incorporated into the alkali metal silicate solution forming a slurry, so that subsequent addition of the acidic zirconium salt solution containing aluminum ions results in the formation of a silica-zirconia-alumina hydrogel containing fines as an integral part thereof. The fines-containing hydrogel may be then treated as previously described, i.e., subjected to hot activation, scavenged, washed, dried, and impregnated with a hydrogenation component.

It has been found that by virtue of the hot activation step, that is, the treatment of the silica-zirconia-alumina hydrogel with an aqueous solution of either (1) an acid such as sulfuric acid, (2) an aluminum salt such as aluminum sulfate, or (3) a combination of an acid and an aluminum salt, the finished catalyst exhibits a selective capacity in hydrocracking hydrocarbons. That is, the hydrocracking results in an increased gasoline yield and in a corresponding decrease in the amount of other fractions produced, so that the overall product distribution is considerably improved. Thus, the silica-zirconia-alumina catalysts made by the method of the present invention offer improved gasoline yields and product distribution as compared to prior art catalysts not subjected to hot activation treatment.

If desired, the silica-zirconia-alumina hydrogel may, prior to hot activation, be subjected to hydrothermal treatment, i.e., contacted with water at an elevated temperature for a specified period of time. Such treatment affords a convenient means for controlling the density of the finished catalyst. In general, the higher the temperature and the longer the time of treatment, the lower is the density of the finished catalyst.

As stated earlier, the two forming solutions, that is, the alkali metal silicate solution and the acidic zirconium salt solution, such as sulfatozirconic acid solution containing aluminum ions, are mixed in such proportions that they will result in a hydrogel having a silica content of from about 75 to 90 percent, a zirconia content of from about 5 to 15 percent by weight, and alumina content of from about 5 to 10 percent by weight, based on the cogelled oxides content. The pH during the forming of the hydrogel should be between about 7 and 10. A more preferred pH range is from 8 to 9.

If the hydrogel is subjected to a hydrothermal treatment, such treatment is desirably carried out at a temperature of from about 70 to 200° F., or more preferably from about 70 to 150° F., for a period of from about 6 to 24 hours.

When it is desired to produce a fines-containing catalyst by the method of the present invention, it is preferred that the fines material be a "high density" material that is insoluble in the hydrosol and is infusible at the temperature of calcination of the hydrogel. A high density material is defined herein as one wherein the particle density is in excess of 3 grams per cubic centimeter. Particle density is computed on the basis of the total volume of the particle including pores therewithin. It is to be distinguished from skeletal density, which is computed solely on the basis of the actual volume occupied by the catalyst material per se and excludes pore space. The subsequent examples illustrate the use of alumina fines, however, other suitable high density materials include barytes, zircon, dead burned clay, bauxite, or other fines that do not adversely affect the catalytic properties may be used. In general, those fines materials disclosed in U.S. Patent 2,900,349 and having a particle density in excess of 3.0 grams per cubic centimeter are suitable high density materials.

Where it is desired to incorporate fines into the catalyst, finely divided calcined alpha alumina may desirably be employed as a fines material. It is composed of alpha alumina which has undergone calcination at a temperature in excess of 2000° F. such that the surface area normally present at low temperature is largely destroyed. Alcoa A-2 alumina has been found to be a very effective form of alumina. A-2 alumina is characterized by a hexagonal crystalline structure and has the following properties.

Chemical analysis, percent:
| | |
|---|---|
| $Al_2O_3$ | 99 |
| $Na_2O$ | 0.50 |
| $Fe_2O_3$ | 0.04 |
| $SiO_2$ | 0.025 |
| Loss on ignition, 1100° C. | 0.30 |
| Water adsorbed at 50% humidity | 0.10 |
| Alpha alumina content, percent | 90+ |

Physical properties:
| | |
|---|---|
| Bulk density, packed, lb./ft.$^3$ | 68 |
| Bulk density, loose lb./ft.$^3$ | 52 |
| Specific gravity | 3.7–3.9 |
| Surface area, m.$^2$/g. | 0.4 |
| Pore volume, ml./g. | 0.25 |
| Pore diameter, A. | 15,000 |

While the incorporation of high density fines into the catalyst constitutes one preferred embodiment of our invention, it will be understood that our invention also finds application wherein "ordinary" lower-density fines are incorporated into the catalyst. Typical lower-density fines materials include recycle catalyst fines, uncalcined clay, and the like. Other lower-density fines materials include those disclosed in U.S. Patent 2,900,349 and having a particule density less than about 3.0 grams per cubic centimeter.

Of course, the optimum fines size and concentration will vary depending upon the particular material used. In general, however, the particle size of the fines should be from about 2 to 7 microns weight mean particle diameter. The fines are desirably incorporated in the sodium silicate solution to form a sodium silicate slurry.

The particle size distribution of the fines introduced into the hydrosol in accordance with the present process was determined by sedimentation methods. The weight mean particle diameters were determined by plotting the cumulative percent of fines, smaller than a given diameter against particle diameter, dividing the total size range into a number of small fractions and calculating as follows:

$$\text{weight mean diameter} = \frac{\Sigma d_i g_i}{\Sigma g_i}$$

wherein $d_i$ is the mean particle size of the fraction in microns and $g_i$ is the corresponding weight percent material in the fraction.

If fines are incorporated into the hydrogel, it is essential, in order to achieve the desired characteristics of density, high diffusivity and high resistance to attrition, that the particle size of the fines incorporated in the gel be within the approximate range of 2 to 7 microns in weight mean particle diameter. A more preferred range is from 4 to 6 microns. It is also desirable, in order to achieve the above desired catalyst characteristics, that that amount of fines incorporated into the gel be within the approximate range of 20 to 60 percent by weight. A more preferred range is from 40 to 50 percent by weight.

The solution employed for the hot activation step may contain either an aluminum salt, an acid, or both. If an aluminum salt is used, it may be any of the readily available water soluble normal salts such as, for example, aluminum chloride, aluminum nitrate, aluminum sulfate, and the like. If an acid is also contained in such solution, it is generally, but not necessarily, characterized by the same acid anion as the aluminum salt employed. Thus, an acidic aluminum salt solution of aluminum sulfate containing sulfuric acid has been found to afford highly satisfactory results in manufacture of the present catalyst. Where an aqueous acid solution is used (without an aluminum salt), any of the usual mineral acids are suitable, e.g., HCl, $H_2SO_4$, $HNO_3$, etc. The pH of the hot activation solution must be no higher than 7, and preferably from zero to 4.

Activation of the hydrogel is carried out using a hot solution, preferably maintained at a temperature between about 125° and 200° F. A more preferred temperature range is from about 150° to 200° F. If the solution is solely an aqueous acid solution, it preferably contains from 1 to 5 percent acid and from 95 to 99 percent water. If the solution consists of an aqueous aluminum salt, it desirably contains from 0.5 to 10 percent aluminum salt and from 90 to 99.5 percent water. A more preferred range is from 1 to 5 percent aluminum salt and from 95 to 99 percent water. If an aqueous solution of both an acid and an aluminum salt is used, the preferred ranges are for each component from 0.5 to 2.5 percent salt, from 0.5 to 2.5 percent acid, and from 95 to 99 percent water.

The time required for the activation of the hydrogel with the hot solution may vary within wide limits, i.e., from as little as one hour up to about 24 hours. More preferably, the treating time is from about 5 to 12 hours. If the activation solution consists of an aqueous acid the time for this treatment is desirably from 3 to 24 hours, or more preferably from about 5 to 8 hours. The preferred temperature range for the aqueous acid is from about 175° to 200° F. If a solution consisting of an aqueous aluminum salt is used, the treating time is desirably from 1 to 24 hours, or more preferably from about 8 to 12 hours, and the solution temperature is from about 150° to 200° F. If a solution containing both an acid and an aluminum salt is used, the treating time may be from 1 to 24 hours, or more preferably from 5 to 8 hours, and the preferred temperature of the solution is from about 150° to 200° F.

The hot activation of the hydrogel is a critical step, for without such hot activation the finished catalyst does not exhibit all of the desirable attributes obtainable by the catalysts of the instant invention. Thus, without such hot activation step the resulting catalyst does not produce higher yields and improved product distribution, which desirable results do occur when the hot activation step is included.

The alkali metal silicate reactant employed in the preparation of the present catalysts is generally sodium silicate but it is contemplated that other alkali metal silicates such as potassium silicate may, likewise, be used.

The aqueous acidic zirconium salt solution, preferably sulfatozirconic acid solution containing aluminum ions employed as another of the reactants is conveniently prepared by adding appropriate quantities of sulfuric acid, zirconium sulfate, and aluminum sulfate to water. Of course, other soluble zirconium salts may be substituted for zirconium sulfate, such as zirconium halides, zirconium nitrate, zirconium carboxylates (e.g. acetate), and the like. Other acids, particularly other mineral acids, may be substituted for sulfuric acid. Similarly, any of the usual soluble aluminum salts previously mentioned may be substituted for aluminum sulfate. The aluminum may even be provided in the form of sodium aluminate. However, in this latter case the salt must be dissolved in the sodium silicate solution and must be of such a nature and concentration as not to cause the silicate to form a gel prior to its admixture with the sulfatozirconic acid solution. Suitable complexing agents may be employed to prevent gelation of the basic solution prior to its admixture with the sulfatozirconic acid solution. Typical complexing agents include citric acid, glycolic acid and the like.

After activation the hydrogel is scavenged with a suitable aqueous solution to remove any zeolitic alkali introduced into the hydrogel from the silicate solution and not removed by hot activation. The hydrogel may be base-exchanged with a suitable aqueous solution containing an ion capable of replacing zeolitic alkali metal, which ion does not detrimentally affect the finished catalyst. Thus, the base exchange solution employed may effect replacement of the zeolitic alkali metal without involving the introduction of an additional metal or metal compound in the hydrogel, such as treatment with a solution of an aluminum salt, an ammonium salt or an acid. By using a base exchange solution or a metal salt other than a metal already contained in the hydrogel, it is possible to introduce quantities of an additional metal oxide into the gel composite. The incorporation of such additional metal oxide into the hydrogel may desirably act as a catalytic promoter under particular reaction conditions.

An aqueous solution of an ammonium salt, e.g. ammonium sulfate, has been found to be quite satisfactory for scavenge. The scavenge may be carried out at room temperature or at temperatures up to about 200° F. Where an aqueous solution of an ammonium salt, e.g. ammonium sulfate, is used such solution should contain from about 0.05 to 1 weight percent of ammonium sulfate. The treatment with the base exchange solution may vary from about one half hour up to 36 hours. More preferably, the treatment may be from about one half hour up to 24 hours.

While as described herein the hot activation step and the scavenge step are carried out successively, if desired these two steps can be combined into a single operation. In commercial production such a combination offers obvious economical advantages.

The hydrogel product after scavenge is water-washed free of soluble matter. The washed hydrogel is then dried, suitably in an atmosphere of superheated steam, at a temperature of about 150° to about 400° F. The dried product is thereafter calcined for from 1 to 24 hours, suitably in an atmosphere of air or steam, at a temperature of from about 1100° to 1600° F. A more preferred range for calcining is from about 1200° to 1450° F.

The finished gel composition may vary within considerable limits. If a fines-containing gel is prepared, the amount of fines present may be from about 20 to 60 weight percent, with the amount of gel phase present correspondingly from 80 to 40 percent. The composition of the gel phase comprises from 5 to 16 percent zirconia, from 5 to 10 percent alumina, and from 75 to 90 percent silica. A more preferred range comprises from 40 to 50 percent fines and from 60 to 50 percent gel phase. A preferred gel phase composition comprises from 5 to 10 percent zirconia, from 5 to 7 percent alumina, and from 83 to 90 percent silica.

The above silica-zirconia-alumina gel is intimately combined with a component exhibiting hydrogenation activity. Suitable hydrogenation components include one or more of the metals of Groups VI and VIII of the Periodic Table either in elemental form or in the form of the oxides or sulfides of these metals. Representative of these metals are molybdenum, chromium, tungsten, iron, cobalt, nickel, and metals of the platinum group, i.e., platinum, palladium, osmium, rhodium, ruthenium and iridium as well as combinations of these metals, their oxides or sulfides. Thus, a particularly desirable combination of metal oxides is that of the oxides of cobalt and moylbdenum intimately combined with the above-described silica-zirconia-alumina gel such as by being impregnated thereon.

Combination of one or more of the above-indicated hydrogenation components with the silica-zirconia-alumina gel may take place in any feasible manner, for example, by impregnating the silica-zirconia-alumina gel by contacting the same with solutions containing ions of the apprioriate hydrogenation component which it is desired to introduce. In this manner, a hydrogenation component can be introduced by deposition of the incoming metal on the silica-zirconia-alumina gel after removal of the impregnating solution of the silica-zirconia-alumina gel carrier. The hydrogenation component may also be combined with the silica-zirconia-alumina gel by utilizing a mixed base technique wherein the base containing the hydrogenation component, for example, cobalt oxide-molybdenum oxide on alumina is admixed in finely divided form with the silica-zirconia-alumina gel. In such mechanical mixtures, the particle size of each of the components making up such a mixture is generally less than about 100 microns in diameter. Other means for combining the silica-zirconia-alumina gel with the hydrogenation component are feasible, such as, for example, the addition of the hydrogenation component to a slurry of the gel.

The amount of hydrogenation component combined with the silica-zirconia-alumina gel may vary widely and will depend on the charge stock undergoing hydrocracking as well as on the particular nature of the hydrogenation component. Generally, the amount of hydrogenation component will be within the range of about 0.01 to 25 percent by weight. When a metal of the platinum series is employed, the amount thereof will generally range from about 0.01 to 5 weight percent. With other hydrogenation components such as the oxides or sulfides of molybdenum, cobalts, tungsten, chromium, iron, and nickel, the amounts employed will generally be within the approximate range of 2 to 25 weight percent. Thus, when the hydrogenation component is a combination of cobalt oxide and molybdenum oxide, the cobalt oxide content is generally in the approximate range of 1 to 4 weight percent and the molybdenum oxide is within the range of 5 to 15 weight percent. It will be understood that in any instance, the amount of hydrogenation component present will be such as to afford a resulting composite in combination with the silica-zirconia-alumina gel of a hydrocracking catalyst characterized by unusual activity and selectivity.

Hydrocarbon charge stocks undergoing hydrocracking in accordance with this invention comprise hydrocrackable hydrocarbons generally and, particularly, petroleum fractions having an initial boiling point of at least about 400° F., a 50 percent point of at least about 500° F. and an end point of at least about 600° F. Such hydrocarbon fractions include gas oils, residual oils, cycle stocks, whole topped crudes and heavy hydrocarbon fractions derived by the destructive hydrogenation of coal, tars, pitches, asphalts and the like. As will be recognized, the distillation of higher boiling petroleum fractions above about 750° F. must be carried out under vacuum in order to avoid thermal cracking. The boiling temperatures utilized herein are expressed in terms for convenience of the boiling point corrected to atmospheric pressure.

Hydrocracking, in accordance with the present process, is generally carried out at a temperature between about 400° F. and about 950° F. The hydrogen pressure in such operation is generally within the range of about 100 to about 3000 p.s.i.g. and, preferably, about 350 to about 2000 p.s.i.g. The liquid hourly space velocity, i.e. the liquid volume of hydrocarbon per hour per volume of catalyst is between about 0.1 to about 4. In general, the molar ratio of hydrogen to hydrocarbon charge employed is between about 2 and about 80, and preferably, between about 5 and about 50.

The process of this invention may be carried out in any equipment suitable for catalytic operations. The process may be operated batchwise. It is preferable, however, and generally more feasible to operate continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation may also be employed with the catalyst described herein. After hydrocracking, the resulting products may suitably be separated from the remaining components by conventional means such as adsorption, distillation, etc. Also, the catalyst after use over an extended period of time may be regenerated in accordance with conventional procedures by burning off carbonaceous deposit from the surface of the catalyst in an oxygen-containing atmosphere under conditions of elevated temperature.

The process described herein may be employed in the preparation of a silica-zirconia-alumina hydrocracking catalyst in any desired physical form. Thus, the hydrosol may be permitted to set in mass to a hydrogel which is thereafter dried and broken into pieces of desired size. The pieces of gel so obtained are generally of irregular shape. Uniformly shaped pieces of gel may be obtained by extrusion of pelleting of the powder-containing hydrogel. Also the hydrosol may be introduced into the perforations of a perforated plate and retained therein until the sol has set to a hydrogel after which the formed hydrogel pieces are removed from the plate. The method of the invention is especially useful as applied to the manufacture of spherically shaped gel particles produced by any feasible process such as that described in patents to Marisic, for example, U.S. 2,384,946. Broadly, such methods involve introducing hydrosol into a column of water-immiscible liquid, for example, an oil medium wherein globules of hydrosol are formed and set to spheroidal bead-like particles of hydrogel. Larger size spheres are ordinarily within the range of from about 1/64 to about 1/2 inch in diameter whereas smaller size spheres which are generally referred to as microspheres are within the range of from about 10 to about 100 microns in diameter. The use of spherically shaped gel particles is of particular advantage in hydrocarbon conversion processes including the moving catalyst bed process, the fluidized process and other processes in which the spheroidal silica-zirconia-alumina hydrocracking catalyst particles are subjected to continuous movement. As applied to the stationary bed, spheroidal gel catalyst particles provided effective contact between the reactants and the catalyst by avoiding channeling.

It is accordingly one embodiment of the present invention to prepare the described attrition-resistant silica-zirconia-alumina gel in the form of spheres although it is to be realized that the method hereinafter set forth may also be employed in obtaining a mass of gel which may thereafter be broken up into particles of desired size. Likewise, the method described herein may be used in preparation of silica-zirconia-alumina hydrocracking catalysts in the form of particles of any other desired size or shape.

The diffusivity of the catalyst is a measure of the ability of fluids to diffuse therethrough and is determined by measuring the rate at which hydrogen under a constant partial pressure, at essentially atmospheric conditions, will pass through a single catalyst particle having a size of 5 to 6 mesh (Tyler). The diffusivity is the average of such determinations on fifteen particles and is expressed as cubic centimeters of hydrogen per centimeter of catalyst per second $\times 10^{+3}$. The catalyst described herein is desirably characterized by a diffusivity determined on the above basis of at least 10 and generally within the range of 15 to 30.

The term "apparent density" as utilized herein refers to the weight as compared with the volume occupied by a packed mass of the catalyst particles. It is determined by weighing a fairly large volume of the catalyst particles. For example, a large diameter graduated cylinder is filled to a volume calibration gently tamped down and the weight of the particles determined by difference in weight of the graduate before and after filling with the particles. The catalyst of the present invention, in one embodiment, i.e., when containing fines of high density as described hereinabove, is characterized by an apparent density of at least 0.9 grams per cubic centimeter.

The attrition characteristics of the catalysts prepared in accordance with the method described herein were determined by an attrition test known as the Lauson Shaker Attrition (LSA) Test. The procedure used in the test consists of shaking a 50 cc. sample of the product to be tested in a closed steel cup which is bolted to the piston of a motor-driven Lauson engine which operates at 1000 r.p.m. After shaking for a time sufficient to produce 10 weight percent fines, capable of passing through an 8 mesh (Tyler) screen, the sample is screened, weighed, and the percentage loss is calculated. These operations are repeated until slightly more than half the sample has been reduced to fines. Cumulative losses are plotted against total shaking time. The cumulative time in seconds for 50 percent weight of fines is read from the curve and is reported as the Lauson Shaker Attrition. Since the LSA of gels is affected by the size of the particles tested, the attrition data reported herein correspond to that of particles having an average particle diameter of 0.140 inch to avoid the interferences of these variables in correlating the effect of quantity and size of added material on attrition. The catalyst of the present invention is characterized by a LSA attrition resistance of at least 1000 seconds.

In accordance with a further aspect of the present invention, it has been found that when the gel time of the hydrosol is increased this permits bead formation at higher metal oxide and product concentration than is ordinarily possible. Product concentration as utilized herein refers at constant fines concentration to the total content of gel oxide product solids present in the freshly formed hydrogel multiplied by 100 and divided by the sum of the total gel oxide solids and water contained in the hydrogel. Mathematically, product concentration ($pc$) may be expressed as follows:

$$pc = \frac{\text{gel oxides}}{\text{gel oxides} + \text{water}} \times 100$$

The gel time is increased considerably if excess acid is added to the sulfatozirconic acid solution containing aluminum ions while at the same time adding an equivalent amount of sodium hydroxide to the silicate solution. The above effect of free acid in increasing gel time is clearly shown by the data given in Table I hereinafter. It will be noted that the addition of excess sulfuric acid increased the gel time from 10 seconds to 40 seconds.

Table I
EFFECT OF FREE ACID ON GEL TIME ($SiO_2$—$ZrO_2$—$Al_2O_3$)

| Solution compositions: | | |
|---|---|---|
| Sulfatozirconic acid-aluminum sulfate solution: | | |
| $H_2O$, percent wt | 91.98 | 90.70 |
| $ZrO_2$, percent wt | 0.81 | 0.80 |
| $Al_2(SO_4)_3$, percent wt | 5.70 | 5.62 |
| $H_2SO_4$, percent wt | 1.41 | 2.78 |
| Total gms. sol'n | 234 | 238 |
| Silicate solution: | | |
| N-brand silicate, percent wt | 44.48 | 44.03 |
| NaOH, percent wt | 0.73 | 1.73 |
| $H_2O$, percent wt | 54.79 | 54.24 |
| Total gms. sol'n | 262 | 264 |
| Dilution $H_2O$, gms | 990 | 990 |
| Hydrogel composition: | | |
| $ZrO_2$, percent wt | 5.1 | 5.1 |
| $Al_2O_3$, percent wt | 10.1 | 10.1 |
| $SiO_2$, percent wt | 84.8 | 84.8 |
| Gel temp. ° F | 55 | 50 |
| Gel time, secs | 10 | 40 |

The presence of the dilution water (990 grams shown in Table I) serves to increase the gel time. Thus, where the gel is formed in a column in the absence of the dilution water, the gel time is considerably reduced, e.g., at 53° F. the gel time is 4.4 seconds.

In accordance with another aspect of the present invention, it has been found that if the total sulfate ion content in the sulfatozirconic acid forming solution is increased, the whole bead content is considerably increased. In order to maintain the pH within the desired range when excess sulfuric acid has been added to the sulfatozirconic acid forming solution, an equivalent amount of an alkali such as sodium hydroxide is added to the silicate forming solution. Preferably, the weight ratio of sulfuric acid to the silica, zirconia, and alumina in the freshly formed hydrogel is from about 0.35 to 0.75. A still more preferred range is from about 0.55 to 0.65.

EXAMPLE 1

This example illustrates the use of the method of the present invention to prepare a fines-containing silica-zirconia-alumina gel. A silica-zirconia-alumina gel was prepared by mixing streams comprising (1) an aqueous sulfatozirconic acid solution containing aluminum ions and (2) an aqueous sodium silicate slurry containing fines. The aqueous sulfatozirconic acid solution was 88.95 percent water, 2.05 percent zirconia, 5.56 percent sulfuric acid, and 3.44 percent aluminum sulfate. This solution had a specific gravity at 60° F. of 1.0955 and a solution rate of 422 cubic centimeters per minute. The sodium silicate slurry consisted of 50.57 percent sodium silicate (N–brand), 11.91 percent alumina fines (Alcoa A–2), 1.29 percent sodium hydroxide, and 36.23 percent water. This slurry had a specific gravity at 75° F. of 1.326 and a solution rate of 434 cubic centimeters per minute. The size of the alumina fines was 4.6/3.2 microns, $dw/ds$ ($dw$=weight mean particle diameter; $ds$=surface mean particle diameter).

These two streams were brought together in such proportions that the resulting pH was 8.5. There resulted a hydrogel. The gel time was 2.9 seconds at a temperature of 54° F. The ratio of acid to oxides, i.e., the ratio of the total amount of sulfate ions present to the weight of silica plus zirconia plus alumina, as formed, was 0.42. The hydrogel was hydrothermally treated for 8 hours with water at 85° F.

The hydrogel was subjected to activation by treating with a three percent acid alum solution consisting of 2.25 percent aluminum sulfate, 0.75 percent sulfuric acid, and 97 percent water. The treatment was carried out for 8 hours at a temperature of 200° F.

The hydrogel was then treated with an aqueous solution of 0.1 percent ammonium sulfate for twelve one-hour exchanges at room temperature thereby to scavenge the hydrogel and to remove any remaining zeolitic sodium therefrom. The hydrogel was water washed, dried, and then subjected for five hours to calcination at a temperature of 1400° F. and an air rate of 3 volumes of air per volume of catalyst per minute (3 v./v./min.). The resulting gel had an apparent density of 0.90 gram per cubic centimeter, an average particle diameter of 0.149 inch, and was 98 percent whole beads. Its Lauson Shaker Attrition was 1100 and its diffusivity was $36.8 \times 10^{-3}$ square centimeters per second. The gel was then subjected to an accelerated aging test by treatment for 10 hours with steam at 1200° F. and at 15 p.s.i.g. pressure. The steam-treated gel had an apparent density of 0.96 gram per cubic centimeter.

The finished gel consisted of 41.2 percent calcined alumina fines, 50 percent silica, 4.2 percent alumina, and 4.6 percent zirconia (Table II).

Table II
PHYSICAL AND CHEMICAL PROPERTIES OF $SiO_2$—$ZrO_2$—$Al_2O_3$ GEL AND HYDROCRACKING CATALYST

| Forming | Ex. 1 pH 8.5 | Ex. 2 pH 8.5 | Ex. 3 pH 8.5 | Ex. 4 pH 8.5 | Ex. 5 pH 8.4 | Ex. 6 pH 8.6 |
|---|---|---|---|---|---|---|
| Zirconium sulfate solution: | | | | | | |
| $H_2O$, percent wt | 88.95 | 94.15 | 90.70 | 89.30 | 92.01 | 88.86 |
| $ZrO_2$, percent wt | 2.05 | 0.68 | 0.84 | 1.43 | 0.93 | [1] 7.46 $Zr(SO_4)_2$. |
| $H_2SO_4$, percent wt | 5.56 | 2.89 | 2.84 | 4.47 | 3.94 | 3.68 |
| $Al_2(SO_4)_3$, percent wt | 3.44 | 2.28 | 5.62 | 4.80 | 3.12 | |
| Sp. gr. at 60° F | 1.0955 | 1.053 | 1.086 | 1.0965 | 1.068 | |
| Solution rate, cc./min | 422 | 452 | 392 | 382 | 480 | 415 |
| Silicate solution: | | | | | | |
| N-brand, percent wt | 50.57 | 52.46 | 39.55 | 35.11 | 60 | [2] 52.22 Q-brand. 10.71 |
| Fines, percent wt | 11.91 | 11.75 | 9.31 | 8.76 | | |
| NaOH, percent wt | 1.29 | | 1.56 | 2.38 | | |
| $H_2O$, percent wt | 36.23 | 35.79 | 49.58 | 53.75 | 40 | 37.07 |
| Sp. gr. at 75° F | 1.326 | 1.310 | 1.252 | 1.236 | 1.211 | |
| Solution rate, cc./min | 434 | 312 | 425 | 385 | 415 | 390 |
| Type fines | Alumina | Alumina | Alumina | Alumina | | Alumina |
| Fines size microns, $dw/ds$ | 4.6/3.2 | 4.6/3.2 | 4.6/3.2 | 4.6/3.2 | | 4.6/3.2 |
| Gel time, sec. temp., ° F | 2.9/54 | 4.0/50 | 4.0/49 | 5.1/48 | 3.2/48 | 3.1/48 |
| Hydrogel processing: Hot Water treat, hrs./temp. °F | 8/85 | 8/85 | 8/85 | 8/85 | 8/120 | 8/200 |
| Activation: | | | | | | |
| $Al_2(SO_4)_3$, percent wt | 2.25 | 2.25 | 2.25 | 2.25 | | 3.0 |
| $H_2SO_4$, percent wt | 0.75 | 0.75 | 0.75 | 0.75 | 3.0 | |
| No. batches | 1 | 1 | 1 | 1 | 1 | 1 |
| Hrs./batch | 8 | 8 | 8 | 8 | 3 | 8 |
| Temp., ° F | 200 | 200 | 200 | 200 | | 200 |
| Scavenge: | | | | | | |
| $(NH_4)_2SO_4$, percent wt | 0.1 | 0.1 | 0.1 | 0.1 | 2 | 0.1 |
| No. batches | 12 | 12 | 12 | 12 | 8 | 12 |
| Hrs/batch | 1 | 1 | 1 | 1 | 2 | 1 |
| Temp., ° F | Rm. Temp. | Rm. Temp. | Rm. Temp. | Rm. Temp. | Rm. Temp. | Rm. Temp. |

Table II—Continued

| Forming | Ex. 1 pH 8.5 | Ex. 2 pH 8.5 | Ex. 3 pH 8.5 | Ex. 4 pH 8.5 | Ex. 5 pH 8.4 | Ex. 6 pH 8.6 |
|---|---|---|---|---|---|---|
| Calcination: | | | | | | |
| Time, hrs | 5 | 5 | 5 | 5 | 5 | 3 |
| Temp., °F | 1,400 | 1,400 | 1,400 | 1,400 | 1,400 | 1,000 |
| Air rate, v./v./min | 3 | 3 | 3 | 3 | 3 | 3 |
| Composition—Finished Gel: | | | | | | |
| $ZrO_2$, percent wt | 4.6 | 2.3 | 2.4 | 4.3 | 5.2 | 5.5 |
| $Al_2O_3$, percent wt | 4.2 | 4.2 | 7.3 | 7.3 | 2.6 | |
| $SiO_2$, percent wt | 50.0 | 52.1 | 49.2 | 46.9 | 92.2 | 49.5 |
| Calcined $Al_2O_3$ fines, percent wt | 41.2 | 41.4 | 41.1 | 41.0 | | 37.0 |
| $MoO_3$, percent wt | | | | | | 7.80 |
| S, percent wt | | | | | | 2.83 |

[1] $Zr(SO_4)_2$.  [2] Q-brand.

EXAMPLES 2–4

The procedure as outlined in Example 1 was repeated, however, the composition of the forming streams was varied in each instance, as shown in Table II. The final gel composition of each is shown in Table II.

EXAMPLE 5

This example illustrates the applicability of the method of the invention to the production of a homogeneous silica-alumina-zirconia hydrogel (containing no fines). The procedure was essentially as that described in Example 1, however, the sodium silicate solution used did not contain any fines or any sodium hydroxide. The compositions of the forming streams, treatment, and final gel composition are given in Table II.

EXAMPLE 6

This example illustrates the impregnation of a specially prepared silica-zirconia-alumina gel with a hydrogenation component to prepare an effective hydrocracking catalyst. The procedure to form the gel was essentially as that described in Example 1, however, the sodium silicate solution contained O–brand sodium silicate (28.7 wt. percent $SiO_2$, 8.9% $Na_2O$, 62.4% $H_2O$) and was mixed with a fines slurry (25 wt. percent A–2 alumina, 75% $H_2O$), as shown in Table II.

The silica-zirconia-alumina gel was used to prepare an effective hydrocracking catalyst. The gel was sized to 8–16 mesh and vacuum impregnated with molybdic acid solution. The vacuum impregnation was as follows: 147 grams of the gel under vacuum were impregnated with 47.3 cubic centimeters of molybdic acid solution, a quantity sufficient to fill the gel pores. The 47.3 cubic centimeters of molybdic acid solution contained 19.1 grams of molybdic acid (molybdenum trioxide and ammonium parmolybdate containing 85% $MoO_3$) the impregnated gel was then dried at 240° F. for 16 hours, calcined at 1000° F. in air for 3 hours, and sulfided with a 50% $H_2$–50% $H_2S$ mixture at 800° F. The final hydrocracking catalyst composition is shown in Table II.

The hydrocracking catalyst was evaluated for hydrocracking a West Texas 650° F.-to-tar gas oil. The results are presented in Table III, and show effective hydrocracking with the catalyst. A high yield of products boiling in the gasoline through light fuel oil range was produced with a concomitantly small amount of light gas product.

Table III

HYDROCRACKING WEST TEXAS 650° F. TAR GAS OIL
[2000 p.s.i.g., 1.0 LHSV, 14,500 s.c.f. $H_2$/bbl. circulation]

Catalyst _____ $MoO_3$ on silica-zirconia-alumina.
Reactor temp., °F. _____ 835.
Conversion to <650° F. product, percent vol. chg. _____ 70.
Product yields, percent of chg.:
  Dry gas ($C_3+$ lighter), percent wt. ___ 3.8
  $C_4$, percent vol. _____ 7.0
  $C_5$, percent vol. _____ 5.2
  Light naphtha (125–180° F.), percent vol. _____ 3.2
  Hvy. naphtha (180–390° F.), percent vol. _____ 28.8
  Lt. fuel oil (390–650° F.), percent vol. _____ 37.8
  Total $C_4+$ yield, percent vol. ____ 112.0
  Hydrogen consumption, s.c.f./b. ___ 1400

The process of our invention is not limited to the specific silica-zirconia-alumina system primarily described. Thus, salts of polyvalent metals other than aluminum may be substituted to prepare silica-zirconia-third component catalysts. For example, chromia, molybdena, or titania might be substituted for alumina as third component.

The silica-zirconia-alumina catalysts produced by the method of our invention, if desired, also may contain other components. For example, the controlled addition of chromia may be effected if it is desired to increase the coke burning rate of the catalyst. Such addition would also serve to prevent afterburning, and yet would not adversely affect the hydrocracking properties of the catalyst.

It will be evident from the compositions and catalytic hydrocracking results described herein that improved hydrocracking catalyst are afforded by the intimate combination of a hydrogenation component with a silica-zirconia-aluminum gel. It will be understood that the above description is merely illustrative of preferred embodiments of the invention. Additional modifications and improvements utilizing the discoveries of the present invention can be readily anticipated by those skilled in the art and may fairly be presumed to be within the scope and purview of the invention as defined by the claims that follow.

We claim:

1. A method of preparing a solid porous hydrocracking catalyst which comprises mixing an aqueous solution of an alkali metal silicate with an aqueous solution of a zirconium salt and an aluminum salt to yield a hydrosol having a pH of from 7 to 10 capable of setting to a hydrogel containing from 5 to 15 percent $ZrO_2$, from 5 to 10 percent $Al_2O_3$, and from 75 to 90 percent $SiO_2$ based on cogelled oxide content, permitting said hydrosol to set to a hydrogel, activating said hydrogel by treatment for from 1 to 24 hours at a temperature of from 125 to 200° F. with an aqueous solution of a compound selected from the group consisting of a mineral acid, an aluminum salt, and mixtures thereof, said solution having a pH of from 0 to 7, washing said hydrogel free of water-soluble material, drying, calcining, and combining the resulting silica-zirconia-alumina gel with a hydrogenation component selected from the group consisting of oxides of metals, sulfides of metals and metals of Groups VI and VIII of the Periodic Table.

2. The method of claim 1 wherein the aqueous solution for said activation consists of from about 1 to 5 percent of a mineral acid and 95 to 99 percent water.

3. The method of claim 1 wherein the aqueous solution for said activation consists of from about 0.5 to 10 percent of an aluminum salt and 90 to 99.5 percent water.

4. The method of claim 1 wherein the aqueous solution for said activation consists of from about 0.5 to 2.5 percent aluminum salt, 0.5 to 2.5 percent mineral acid and 95 to 99 percent water.

5. The method of claim 1 wherein the aluminum salt is aluminum sulfate and the mineral acid is sulfuric acid.

6. The method of claim 1 wherein said catalyst is characterized by a high diffusivity and an apparent density of at least 0.9 gram per cubic centimeter and said alkali metal silicate solution contains a predetermined amount of powdered material insoluble therein and infusible at the temperature of calcination, said powdered material having a weight mean particle diameter of from about 2 to 7 microns and being present in said silicate solution in such quantity as to comprise from 20 to 60 percent of said finished catalyst.

7. The method of claim 6 wherein the particle density of said fines is in excess of 2.5 grams per cubic centimeter.

8. A method of preparing a solid porous hydrocracking catalyst which comprises mixing an aqueous solution of an alkali metal silicate with an aqueous solution of a zirconium salt, an aluminum salt, and a mineral acid to yield a hydrosol having a pH of from 7 to 10 capable of setting to a hydrogel containing from 5 to 15 percent $ZrO_2$, from 5 to 10 percent $Al_2O_3$, and from 75 to 90 percent $SiO_2$ based on co-gelled oxides content, permitting said hydrosol to set to a hydrogel, hydrothermally treating said hydrogel at a temperature of from about 70 to 200° F. for a period of from about 6 to 24 hours, activating said hydrogel by treatment for from 1 to 24 hours at a temperature of from 125 to 200° F. with an aqueous solution of a compound selected from the group consisting of a mineral acid, an aluminum salt, and mixtures thereof, said solution having a pH of from 0 to 7, scavenging said hydrogel for from about one half to 36 hours with an aqueous solution containing from about 0.05 to 1 percent by weight of an ammonium salt to induce base exchange and thereby to remove any remaining zeolitic alkali therefrom, washing said hydrogel free of water-soluble material, drying, calcining, and combining the resulting silica-zirconia-alumina gel with a hydrogenation component selected from the group consisting of oxides of metals, sulfides of metals and metals of Groups VI and VIII of the Periodic Table.

9. The method of claim 8 wherein the aqueous solution for said activation consists of from 90 to 99.5 percent water and a material selected from the group consisting of 1 to 5 percent of a mineral acid, 0.5 to 10 percent of an aluminum salt, and a combination of 0.5 to 2.5 percent aluminum salt and 0.5 to 2.5 percent mineral acid.

10. A method of preparing a solid porous hydrocracking catalyst which comprises mixing an aqueous solution of sodium silicate with an aqueous solution of a zirconium salt, aluminum sulfate, and sulfuric acid, to yield a hydrosol having a pH of from 8 to 9 and capable of setting to a hydrogel containing from 5 to 15 percent $ZrO_2$, from 5 to 10 percent $Al_2O_3$, and from 75 to 90 percent $SiO_2$ based on co-gelled oxides content, the weight ratio of sulfuric acid to co-gelled oxides in said hydrogel being from about 0.35 to 0.75, permitting said hydrosol to set to a hydrogel, hydrothermally treating said hydrogel at a temperature of from about 70 to 200° F. for a period of from about 6 to 24 hours, activating said hydrogel by treatment for from 1 to 24 hours at a temperature of from about 125 to 200° F. with an aqueous solution of a compound selected from the group consisting of a mineral acid, an aluminum salt, and mixtures thereof, said solution having a pH of from 0 to 5, scavenging said hydrogel for from about one-half to 36 hours with an aqueous solution containing from about 0.05 to 1 percent by weight of an ammonium salt to induce base exchange and thereby to remove any remaining zeolitic alkali, washing said hydrogel free of water-soluble material, drying, calcining, and combining the resulting silica-zirconia-alumina gel with a hydrogenation component selected from the group consisting of oxides of metals, sulfides of metals and metals of Groups VI and VIII of the Periodic Table.

11. A method of preparing a silica-zirconia-alumina hydrocracking catalyst and hydrocracking therewith which comprises mixing an aqueous solution of an alkali metal silicate with an aqueous solution of a zirconium salt and an aluminum salt, to yield a hydrosol having a pH of from 7 to 10 and capable of setting to a hydrogel containing from 5 to 15 percent $ZrO_2$, from 5 to 10 percent $Al_2O_3$, and from 75 to 90 percent $SiO_2$ based on co-gelled oxides only, permitting said hydrosol to set to a hydrogel, activating said hydrogel by treatment for from 1 to 24 hours at a temperature of from 125 to 200° F. with an aqueous solution of a compound selected from the group consisting of a mineral acid, an aluminum salt, and mixtures thereof, said solution having a pH of from 0 to 7, washing said hydrogel free of water-soluble material, drying and calcining thereby to obtain a solid, porous silica-zirconia-alumina gel, combining the resulting silica-zirconia-alumina gel with a hydrogenation component selected from the group consisting of oxides of metals, sulfides of metals and metals of Groups VI and VIII of the Periodic Table, and thereafter contacting said impregnated hydrogel with a hydrocarbon charge under catalytic hydrocracking conditions thereby to obtain an improved gasoline yield therefrom.

12. A catalytic composition consisting essentially of a hydrogenation component selected from the group consisting of oxides of metals, sulfides of metals and metals of Groups VI and VIII of the Periodic Table, in intimate combination with a silica-zirconia-alumina gel prepared by mixing an aqueous solution of an alkali metal silicate with an aqueous solution of a zirconium salt and an aluminum salt, to yield a hydrosol having a pH of from 7 to 10 and subsequently to set to a hydrogel containing from 5 to 15 percent $ZrO_2$, from 5 to 10 percent $Al_2O_3$, and from 75 to 90 percent $SiO_2$ based on co-gelled oxides content, permitting said hydrosol to set to a hydrogel, activating said hydrogel by treatment for from 1 to 24 hours at a temperature of from 125 to 200° F. with an aqueous solution of a compound selected from the group consisting of a mineral acid, an aluminum salt, and mixtures thereof, said solution having a pH of from 0 to 7, washing said hydrogel free of water-soluble material, drying and calcining.

13. A catalytic composition consisting essentially of between about 2 and about 25 weight percent of molybdenum deposited on a silica-zirconia-alumina gel prepared by mixing an aqueous solution of an alkali metal silicate with an aqueous solution of a zirconium salt and an aluminum salt, to yield a hydrosol having a pH of from 7 to 10 and capable of setting to a hydrogel containing from 5 to 15 percent $ZrO_2$, from 5 to 10 percent $Al_2O_3$, and from 75 to 90 percent $SiO_2$ based on co-gelled oxides content, permitting said hydrosol to set to a hydrogel, activating said hydrogel by treatment for from 1 to 24 hours at a temperature of from 125 to 200° F. with an aqueous solution of a compound selected from the group consisting of a mineral acid, an aluminum salt, and mixtures thereof, said solution having a pH of from 0 to 7, washing said hydrogel free of water-soluble material, drying and calcining.

14. A catalytic composition consisting essentially of between about 0.01 and about 5 weight percent of platinum deposited on a silica-zirconia-alumina gel prepared by mixing an aqueous solution of an alkali metal silicate with an aqueous solution of a zirconium salt and an aluminum salt, to yield a hydrosol having a pH of from 7 to 10 and capable of setting to a hydrogel containing from 5 to 15 percent $ZrO_2$, from 5 to 10 percent $Al_2O_3$, and from 75 to 90 percent $SiO_2$ based on co-gelled oxides content, permitting said hydrosol to set to a hydrogel, activating said hydrogel by treatment for from 1 to 24 hours at a temperature of from 125 to 200° F. with an aqueous solution of a compound selected from the group consisting of a mineral acid, an aluminum salt, and mixtures thereof, said solution having a pH of from 0 to 7, washing said hydrogel free of water-soluble material, drying and calcining.

15. A catalytic composition consisting essentially of a minor proportion of nickel-tungsten-sulfide deposited on a silica-zirconia-alumina gel prepared by mixing an aqueous solution of an alkali metal silicate with an aqueous solution of a zirconium salt and an aluminum salt, to yield a hydrosol having a pH of from 7 to 10 and capable of setting to a hydrogel containing from 5 to 15 percent $ZrO_2$, from 5 to 10 percent $Al_2O_3$, and from 75 to 90 percent $SiO_2$ based on co-gelled oxides content, permitting said hydrosol to set to a hydrogel, activating said hydrogel by treatment for from 1 to 24 hours at a temperature of from 125 to 200° F. with an aqueous solution of a compound selected from the group consisting of a mineral acid, an aluminum salt, and mixtures thereof, said solution having a pH of from 0 to 7, washing said hydrogel free of water-soluble material, drying and calcining.

16. A catalytic composition consisting essentially of between about 1 and about 4 weight percent of cobalt oxide and between about 5 and about 15 weight percent of molybdenum oxide deposited on a silica-zirconia-alumina gel prepared by mixing an aqueous solution of an alkali metal silicate with an aqueous solution of a zirconium salt and an aluminum salt, to yield a hydrosol having a pH of from 7 to 10 and capable of setting to a hydrogel containing from 5 to 15 percent $ZrO_2$, from 5 to 10 percent $Al_2O_3$, and from 75 to 90 percent $SiO_2$ based on co-gelled oxides content, permitting said hydrosol to set to a hydrogel, activating said hydrogel by treatment for from 1 to 24 hours at a temperature of from 125 to 200° F. with an aqueous solution of a compound selected from the group consisting of a mineral acid, an aluminum salt, and mixtures thereof said solution having a pH of from 0 to 7, washing said hydrogel free of water-soluble material, drying and calcining.

17. A process for hydrocracking a hydrocarbon charge by contacting the same in the presence of hydrogen under hydrocracking conditions with a catalyst consisting essentially of a hydrogenation component selected from the group consisting of oxides of metals, sulfides of metals and metals of Groups VI and VIII of the Periodic Table in intimate combination with a silica-zirconia-alumina gel, said catalyst being prepared according to the method of claim 1.

18. A process for hydrocracking a hydrocarbon charge by contacting the same in the presence of hydrogen under hydrocracking conditions with a catalyst consisting essentially of a hydrogenation component selected from the group consisting of oxides of metals, sulfides of metals and metals of Groups VI and VIII of the Periodic Table in intimate combination with a silica-zirconium-alumina gel, said catalytic being prepared according to the method of claim 8.

19. A process for hydrocracking a hydrocarbon charge by contacting the same in the presence of hydrogen under hydrocracking conditions with a catalyst consisting essentially of a hydrogenation component selected from the group consisting of oxides of metals, sulfides of metals and metals of Groups VI and VIII of the Periodic Table in intimate combination with a silica-zirconia-alumina gel, said catalyst being prepared according to the method of claim 10.

20. A method of preparing a solid porous hydrocracking catalyst which comprises mixing an aqueous solution of an alkali metal silicate with an aqueous solution of a zirconium salt and at least one other polyvalent metal salt to yield a hydrosol having a pH of from 7 to 10 capable of setting to a hydrogel containing from 5 to 15 percent $ZrO_2$ and from 75 to 90 percent $SiO_2$ based on co-gelled oxide content, permitting said hydrosol to set to a hydrogel, activating said hydrogel by treatment for from 1 to 24 hours at a temperature of from 125 to 200° F. with an aqueous solution of a compound selected from the group consisting of a mineral acid, an aluminum salt, and mixtures thereof, said solution having a pH of from 0 to 7, washing said hydrogel free of water soluble material, drying, calcining, and combining the resulting multicomponent gel with a component exhibiting hydrogenation activity selected from the group consisting of oxides of metals, sulfides of metals, and metals of Groups VI and VIII of the Periodic Table.

21. The method of claim 20 wherein said polyvalent metal salt is selected from the group consisting of salts of chromium, molybdenum, titanium and mixtures thereof with one another.

References Cited by the Examiner
UNITED STATES PATENTS

| | | | |
|---|---|---|---|
| 2,945,805 | 7/60 | Ciapetta et al. | 208—111 |
| 3,132,091 | 5/64 | Young | 208—111 |
| 3,140,250 | 7/64 | Cramer et al. | 208—120 |

PAUL M. COUGHLAN, *Primary Examiner.*

ALPHONSO D. SULLIVAN, *Examiner.*

UNITED STATES PATENT OFFICE
CERTIFICATE OF CORRECTION

Patent No. 3,193,491                                                July 6, 1965

Robert H. Cramer et al.

It is hereby certified that error appears in the above numbered patent requiring correction and that the said Letters Patent should read as corrected below.

Column 3, line 51, for "from" read -- form --; column 4, line 4, for "subjected" read -- subjecting --; column 8, line 5, for "5 to 16" read -- 5 to 15 --; line 59, for "cobalts" read -- cobalt --; column 13, line 40, for "O-brand" read -- Q-brand --; column 18, line 7, for "zirconium" read -- zirconia --.

Signed and sealed this 8th day of February 1966.

(SEAL)
Attest:

ERNEST W. SWIDER                                           EDWARD J. BRENNER
Attesting Officer                                               Commissioner of Patents

UNITED STATES PATENT OFFICE
CERTIFICATE OF CORRECTION

Patent No. 3,193,492                                                     July 6, 1965

Charles J. Plank et al.

It is hereby certified that error appears in the above numbered patent requiring correction and that the said Letters Patent should read as corrected below.

Column 1, lines 42 and 43, for "zirconum" read -- zirconium --; column 2, line 41, for "with 24 hours" read -- within 24 hours --; column 3, line 52, for "80 percent" read -- 85 percent --; column 5, line 31, for "900° F. to" read -- 900° F. To --; column 7, line 15, for "24 hors" read -- 24 hours --.

Signed and sealed this 30th day of November 1965.

(SEAL)
Attest:

ERNEST W. SWIDER                                      EDWARD J. BRENNER
Attesting Officer                                          Commissioner of Patents